United States Patent
Kaminsky, Jr.

(10) Patent No.: US 10,673,132 B2
(45) Date of Patent: Jun. 2, 2020

(54) COMPUTER NETWORK ROUTING DEVICE WITH DECORATIVE COVERING AND METHOD OF DISTRIBUTING COMPUTER NETWORK ROUTING DEVICES

(71) Applicant: Robert Joseph Kaminsky, Jr., Homer Glen, IL (US)

(72) Inventor: Robert Joseph Kaminsky, Jr., Homer Glen, IL (US)

( * ) Notice: Subject to any disclaimer, the term of this patent is extended or adjusted under 35 U.S.C. 154(b) by 137 days.

(21) Appl. No.: 15/985,881

(22) Filed: May 22, 2018

(65) Prior Publication Data

US 2019/0363433 A1 Nov. 28, 2019

(51) Int. Cl.
*H01Q 1/44* (2006.01)
*H01Q 1/22* (2006.01)

(52) U.S. Cl.
CPC .............. *H01Q 1/44* (2013.01); *H01Q 1/2291* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,343,896 A * | 9/1967 | Mangels et al. | ....... | A47B 81/06 312/7.2 |
| 3,588,212 A * | 6/1971 | Gersch | ........... | A47B 45/00 312/204 |
| 4,863,782 A * | 9/1989 | Wang | ........... | B44C 3/02 428/204 |
| 5,226,557 A * | 7/1993 | Nelson | ........... | F16L 59/024 206/523 |
| 5,941,617 A * | 8/1999 | Crane, Jr. | ........... | B44C 5/04 312/204 |
| 6,301,102 B1 * | 10/2001 | Ybarra | ........... | G06F 1/1607 292/148 |
| 6,932,341 B1 * | 8/2005 | Kenyon | ........... | A63F 13/02 273/148 B |
| 7,078,085 B2 * | 7/2006 | Nykamp | ........... | A47B 96/206 150/158 |
| 7,336,504 B2 * | 2/2008 | Mazzochi | ........... | G06F 1/18 292/148 |
| 7,555,325 B2 * | 6/2009 | Goros | ........... | H04B 1/3888 455/128 |

(Continued)

*Primary Examiner* — Lisa Lea-Edmonds
(74) *Attorney, Agent, or Firm* — Wood, Phillips, Katz, Clark & Mortimer

(57) ABSTRACT

The combination of a stand-alone computer network routing device, configured to receive and transmit electronic data and having a housing with an exposed external surface; and a first decorative covering configured to be connected to the computer network routing device to overlie a substantial portion of the exposed external surface of the computer network routing device housing to thereby at least one of: a) cause the first decorative covering to hide the identity of the computer network routing device; and b) cause the computer network routing device with the connected first decorative covering to have an aesthetic appearance that is at least one of: i) substantially altered from an appearance of the computer network routing device by itself; and ii) compatible with a room décor in which the computer network routing device is intended to be used. A method of distributing computer network routing devices is also contemplated.

24 Claims, 3 Drawing Sheets

(56) References Cited

U.S. PATENT DOCUMENTS

| | | | | |
|---|---|---|---|---|
| 8,553,400 | B2* | 10/2013 | Moran | G09F 9/30 |
| | | | | 340/815.49 |
| 8,568,241 | B2* | 10/2013 | Bailey | A63F 13/98 |
| | | | | 206/320 |
| 10,481,646 | B2* | 11/2019 | Wu | G06F 1/181 |
| 2003/0002246 | A1* | 1/2003 | Kerr | G06F 1/1601 |
| | | | | 361/679.02 |
| 2003/0202318 | A1* | 10/2003 | Lee | G06F 1/181 |
| | | | | 361/679.02 |
| 2004/0224135 | A1* | 11/2004 | Krebs | G06K 7/0008 |
| | | | | 428/195.1 |
| 2009/0225023 | A1* | 9/2009 | Szolyga | G09G 3/344 |
| | | | | 345/107 |
| 2013/0314862 | A1* | 11/2013 | Latto | G03B 17/56 |
| | | | | 361/679.01 |

* cited by examiner

COMPUTER NETWORK ROUTING DEVICE WITH DECORATIVE COVERING AND METHOD OF DISTRIBUTING COMPUTER NETWORK ROUTING DEVICES

BACKGROUND OF THE INVENTION

Field of the Invention

This invention relates to computer network routing devices and, more particularly, to a computer network routing device with a decorative covering used in conjunction with the computer network routing device to change the appearance thereof and additionally to a method of distributing computer network routing devices.

Background Art

Stand-alone computer network routing devices/routers are used worldwide in homes and businesses to send and receive signals/data to thereby facilitate access to the internet or a private computer network. Appearance-wise, a typical router of this type has a relatively small, nominally squared, housing with a square/rectangular footprint and a low vertical profile. One or more antennae project from the housing.

Routers are strategically positioned to maximize received and transmitted signals. Certain building configurations may require several routers to be placed throughout, such that they remain clearly visible to persons present within the building.

While routers are generally relatively unobtrusive and not particularly unsightly, they, by themselves, nonetheless stand out and clash with a surrounding décor. This has led to a wide range of different ways to mask the presence of the router in various environments.

Many different structures have been developed to achieve the above end. For example, faux, hollow books have been provided with a cavity into which the router housing can be loosely fit. Routers have been placed in cabinets. Many other approaches have been taken. Generally, the most common approach has been to hide the presence of the router without altering its appearance.

SUMMARY OF THE INVENTION

In one form, the invention is directed to the combination of a stand-alone computer network routing device and a first decorative covering. The stand-alone computer network routing device is configured to receive and transmit electronic data. The computer network routing device has a housing with an exposed external surface. The first decorative covering is configured to be connected to the computer network routing device to overlie a substantial portion of the exposed external surface of the computer network routing device housing to thereby at least one of: a) cause the first decorative covering to substantially hide the identity of the computer network routing device; and b) cause the computer network routing device with the connected first decorative covering to have an aesthetic appearance that is at least one of: i) substantially altered from an appearance of the computer network routing device by itself; and ii) compatible with a room décor in which the computer network routing device is intended to be used.

In one form, a second decorative covering is provided and configured to be connected to the computer network routing device in place of the first decorative covering. The second decorative covering has a function substantially the same as a function of the first decorative covering but causes the computer network routing device with the connected second decorative covering to have an appearance different than an appearance of the computer network routing device with the connected first decorative covering.

In one form, the first decorative covering and computer network routing device are configured so that with the first decorative covering connected to the computer network routing device, the first decorative covering and computer network routing device are maintained together as a first unit with the first decorative covering and computer network routing device, making up the first unit, movable together as one piece.

In one form, the first decorative covering defines a first receptacle that is at least nominally matched to a portion of the external surface of the computer network routing device housing such that with the first decorative covering connected to computer network routing device, the portion of the external surface of the computer network routing device housing is located in the first receptacle.

In one form, the first receptacle and the portion of the external surface of the computer network routing device housing are configured so that a majority of the external surface of the computer network routing device housing resides within the first receptacle with the first decorative covering connected to the computer network routing device.

In one form, the computer network routing device and first decorative covering are configured so that the connected computer network routing device and first decorative covering are frictionally maintained together.

In one form, there is at least one connector on each of the computer network routing device and the first decorative covering that interact to maintain the computer network routing device and first decorative covering connected.

In one form, the at least one connector on the computer network routing device is an inseparable part of the computer network routing device. The at least one connector on the first decorative covering is an inseparable part of the first decorative covering.

In one form, the combination further includes at least one separate fastener that maintains the first decorative covering connected to the computer network routing device.

In one form, the first decorative covering and the computer network routing device are configured so that the first decorative covering can be separably connected to the computer network routing device.

In one form, the at least one connector on the computer network routing device and at least one connector on the first decorative covering are configured to be snap-connected to each other.

In one form, an adhesive component maintains the first decorative covering connected to the computer network routing device.

In one form, the invention is directed to a method of distributing stand-alone computer network routing devices. The method includes the steps of: A) distributing a first form of computer network routing device; and B) distributing at least one of: a) a second form of computer network routing device with an exposed external surface together with a first decorative covering configured to be connected to the second form of computer network routing device to overlie a substantial portion of the exposed external surface of the second form of computer network routing device housing to thereby at least one of: i) cause the first decorative covering to hide the identity of the second form of computer network routing device; and ii) cause the second form of computer network routing device with the connected first decorative covering to have an aesthetic appearance that is at least one of: I) substantially altered from an appearance of the second form of computer network routing device by itself; and II)

compatible with a room décor in which the second form of computer network routing device is intended to be used; or b) the first form of computer network routing device at least one of: i) modified to be connected to the first decorative covering; or ii) together with an adaptor assembly that is configured to be used to connect the first decorative covering to the first form of computer network routing device.

In one form, the method further includes the step of distributing a second decorative covering configured to be interchangeably connected with the first decorative covering and having a function substantially the same as the first decorative covering but causing one computer network routing device with the connected second decorative covering to have an appearance different than an appearance of the one computer network routing device with the connected first decorative covering.

In one form, the first decorative covering and an associated computer network routing device are configured so that with the first decorative covering connected to the associated computer network routing device, the first decorative covering and associated computer network routing device are maintained together as a first unit with the first decorative covering and associated computer network routing device, making up the first unit, movable together as one piece.

In one form, the first decorative covering defines a first receptacle that is at least nominally matched to a portion of the external surface of an associated computer network routing device housing such that with the first decorative covering connected to the associated computer network routing device, the portion of the external surface of the associated computer network routing device housing is located in the first receptacle.

In one form, the first receptacle is configured so that a majority of the external surface of the associated computer network routing device housing resides within the first receptacle with the first decorative covering connected to the associated computer network routing device.

In one form, the first decorative covering and an associated computer network routing device are configured so that the associated computer network routing device and first decorative covering are frictionally maintained together.

In one form, there is at least one connector on each of the first decorative covering and an associated computer network routing device that interact to maintain the associated computer network routing device and first decorative covering connected.

In one form, the at least one connector on the associated computer network routing device is an inseparable part of the associated computer network routing device. The at least one connector on the first decorative covering is an inseparable part of the first decorative covering.

In one form, the method further includes at least one fastener that maintains the first decorative covering connected to an associated computer network routing device.

In one form, the first decorative covering and an associated computer network routing device are configured so that the first decorative covering is separably connected to the associated computer network routing device.

In one form, the at least one connector on the associated computer network routing device and at least one connector on the first decorative covering are configured to be snap-connected to each other.

In one form, an adhesive component maintains the first decorative covering connected to an associated computer network routing device.

In one form, the method further includes the steps of: pre-arranging with a first entity for the first entity to provide the first decorative covering and pre-arranging with a second entity for the second entity to provide the second decorative covering.

In one form, the first and second entities are different entities than an entity performing step A). In one form, the first form of computer network routing device by itself is not configured to be connected to either the first or second decorative coverings.

DETAILED DESCRIPTION OF THE PREFERRED EMBODIMENT

Figure 1:
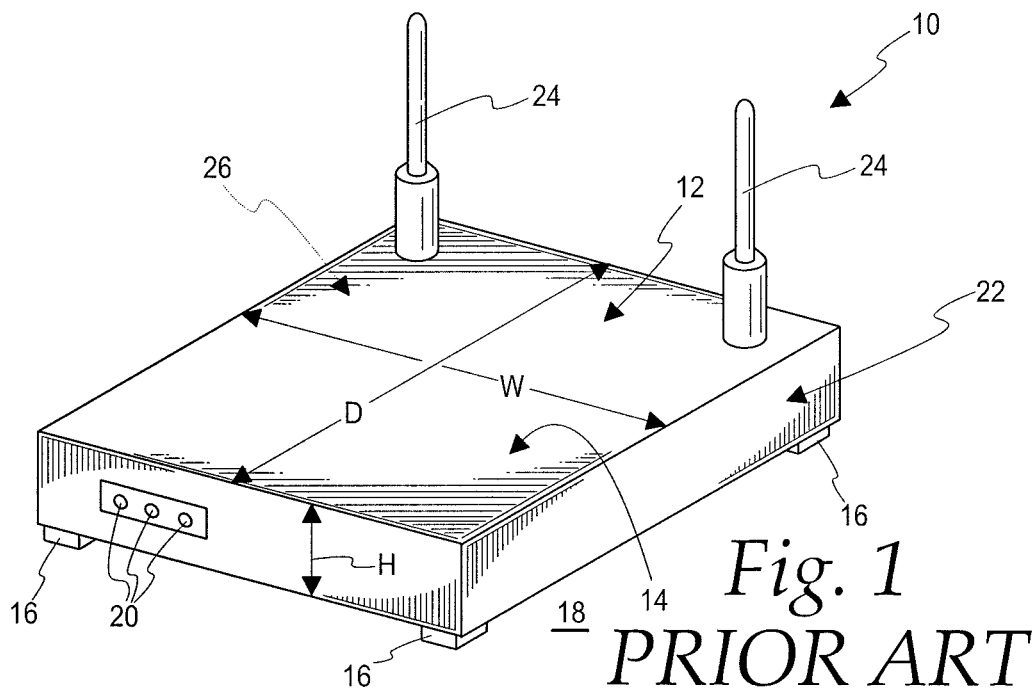
FIG. 1 is a perspective view of a prior art, stand-alone computer network routing device/router with which the present invention can be practiced.

In FIG. 1, a general configuration for a prior art, wireless, stand-alone, computer network routing device/router is shown at 10. The router 10 has a housing 12 with a generally squared shape and an exposed eternal surface 14. The precise configuration of the router housing 12, for purposes of the invention herein, is not critical. The form shown has a depth D and a width W that combine to produce a generally square/rectangular shape that defines the footprint for the housing 12. The housing 12 has a vertical dimension H. In this embodiment feet 16 are provided at the bottom of the housing 12 to support the router 10 on a subjacent surface 18.

Connecting ports 20 are provided in the peripheral wall 22 of the housing 12. Two antennae 24 project upwardly from the top of the housing 12. The housing 12 contains internal processing circuitry 26 to allow for reception and transmission of data signals.

As described in the Background portion herein, one or more routers 10, as shown generally in FIG. 1, are strategically placed to perform conventional data transmission functions. As described above in the Background portion, routers 10 of this type are often concealed in different manners whereby their function is not inhibited.

Figure 2:
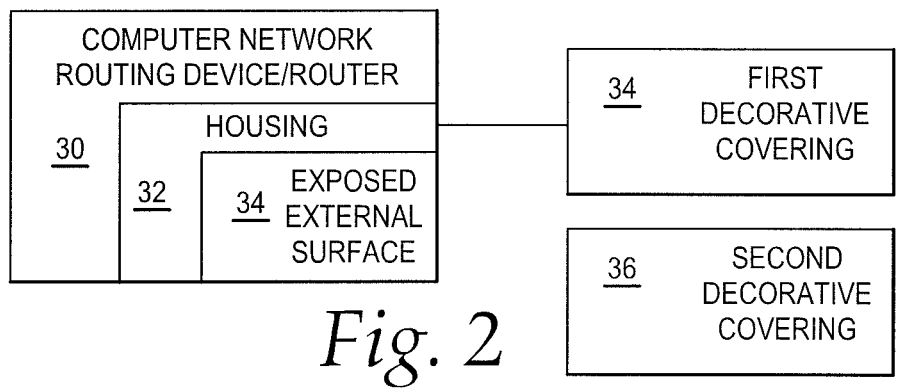
FIG. 2 is a schematic representation intended to encompass all variations of conventionally operating computer network routing devices in combination with first and second decorative coverings that may be connected to the computer network routing device to change the appearance thereof.

The invention is concerned not with either the particular electronics of the router or its particular housing configuration, but more generally with any stand-alone computer network routing device/router, as shown generically at 30 in FIG. 2, that performs any type of router function within a home or business.

Likewise, the shape of the housing 32 to which the invention relates, as shown generically in FIG. 2, is not critical to the present invention. FIG. 1 shows, in a somewhat schematic sense, one exemplary form of conventional router 10. However, router manufacturers are devising many different shapes with the commonality being that the router housing has a relatively small volume whereby, even in the absence of any type of concealing structure, its appearance is relatively unobtrusive.

Within the generic showing in FIG. 2, an exposed external surface is depicted at 34. Regardless of the size and/or shape of the housing 32 and/or the exposed external surface 34 thereof, the invention can be practiced in substantially the same manner.

There currently is a multiple of manufacturers distributing stand-alone computer network routing devices worldwide that are adaptable to the present invention, among which are Apple Inc., Belkin, Cisco, D-Link, HP Inc., Linksys, Motorola, and Netgear. Many other manufacturers offer this same type of product.

According to the invention, a first decorative covering 34 is provided. The router 30 and first decorative covering 34 are configured so that the first decorative covering 34 can be connected to the router 30 to overlie a substantial portion of the exposed external surface 34 of the housing 32 to thereby at least one of: a) cause the first decorative covering 34 to substantially hide the identity of the router 30; and b) cause the router 30 with the connected first decorative covering 34 to have an aesthetic appearance that is at least one of: i) substantially altered from an appearance of the router by itself; and ii) compatible with a room décor in which the router is intended to be used.

The nature of the first decorative covering 34 is not limited. It may be such as to either blend with the room décor or stand out in a particular environment in which it is located. In the latter category, team logos might be incorporated into the first decorative covering 34. Advertisements might be provided for entities other than those supplying the router 30. The first decorative covering 34 may have some totally fanciful design. These are but examples of the virtually unlimited potential appearances for the first decorative covering.

In the "blending" application, the first decorative covering 34 might be something adapted to support photographs owned by the end user. The first decorative covering 34 might simulate a room décor object or may be customized to blend, as by color, pattern, or textures, into a particular room décor.

In both categories for the first decorative covering 34, the nature of the appearance is without limit. The generic showing of the first decorative covering 34 in FIG. 2 is intended to encompass the variations described above and virtually an unlimited number of additional variations consistent with the basic concepts described herein.

A second decorative covering 36 may be provided that is configured to be connected to the router 30 in place of the first decorative covering 34. The second decorative covering 36 has a function substantially the same as that of the first decorative covering 34, but causes the router 30 to have an appearance different than an appearance of the router 30 with the first decorative covering connected thereto.

In a preferred form, the decorative coverings 34, 36 and router 30 are configured so that with the coverings 34, 36 connected to the router 30, the router 30 and its associated covering 34, 36 are maintained together as a first unit such that they are movable together as one piece. Virtually an unlimited number of interconnections between the router 30 and the coverings 34, 36 are contemplated to form such a unit.

Figure 3:
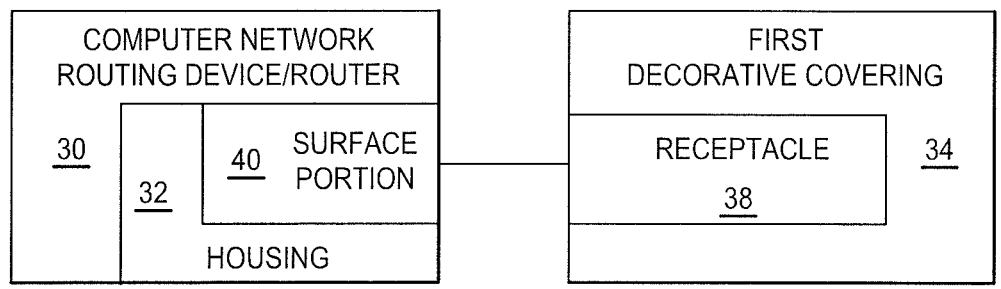
FIGS. 3-7 are schematic representations showing different structural connections between the computer network routing device and the exemplary first decorative covering, according to the invention.

For example, as shown in FIG. 3 for the representative first decorative covering 34, a receptacle 38 is formed thereon that is at least nominally matched to a portion 40 of the exposed external surface 34 of the housing 32. With the first decorative covering 34 connected to the router 30, the surface portion 40 is located in the receptacle 38.

In one form, the receptacle 38 and housing 30 are configured so that a majority of the exposed external surface 34 of the router 30 resides within the receptacle 38 with the first decorative covering 34 connected to the router 30.

The receptacle 38 and surface portion 40 may have a relatively closely conforming shape that allows for a compact construction of a unit consisting of the router 30 and first decorative covering 34. Close conformity may permit a press-fit connection that is frictionally maintained.

Figure 4:
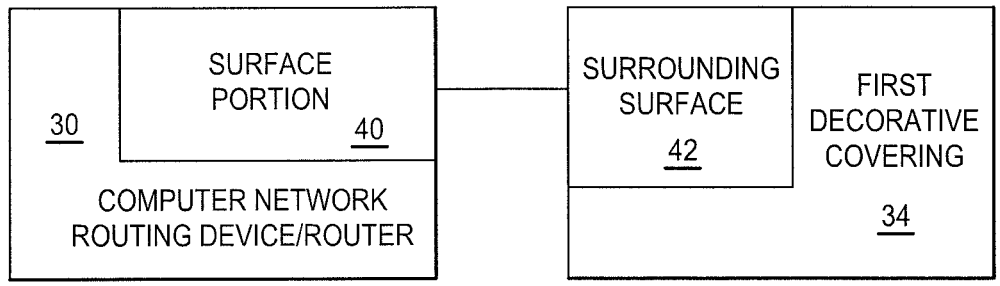

In one form, as shown in FIG. 4, the first decorative covering 34 may have a surface 42 surrounding the receptacle 38 that frictionally engages the surface portion 40 on the router 30. With this arrangement, a press fit connection might be effected between the router housing 32 and the first decorative covering 34, as by causing discrete portions of the router 30 and decorative covering 34 to bind. One or more discrete binding locations may be provided without requiring overall, or substantial, shape conformity.

Figure 5:
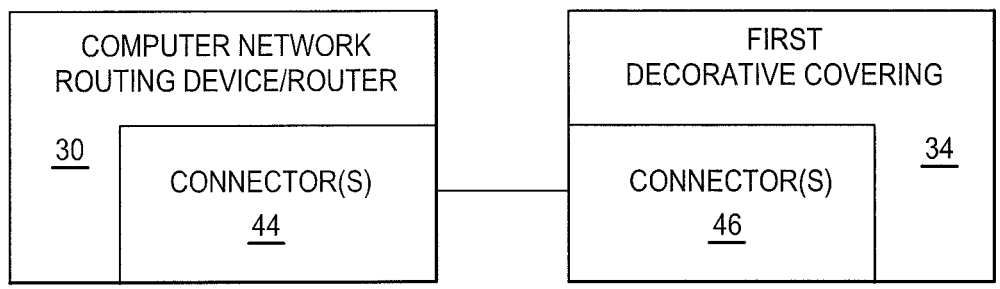

In an alternative form, as shown in FIG. 5, at least one connector 44 may be provided on the router 30 that interacts with at least one connector 46 on the first decorative covering 34 to maintain the router 30 and first decorative covering 34 connected as a unit.

The connectors 44, 46 may take virtually an unlimited number of different forms as is contemplated by the generic disclosure thereof. For example, the connectors 44, 46, may be configured to effect a snap fit connection commonly accomplished by using cooperating male and female parts. Hook-and-loop type fasteners might be utilized. Straps, bands, etc. might be utilized.

In one preferred form, the connectors 44, 46 are inseparable parts of the router 30 and first decorative covering 34, respectively. As a result, the router 30 and first decorative covering 34 are at all times in a state to be connected to each other.

The connection of the router 30 to the first decorative covering 34 may be releasable such that the first decorative covering 34 may be connected to and thereafter separated from the router 30, allowing for substitution of the second decorative covering 34 therefor or use of the router 30 without any decorative covering.

Alternatively, the effected connection between the router 30 and first decorative covering 34 may be inseparably maintained in the sense that the router 30 and/or first decorative covering 34 would have to be substantially altered to effect this separation.

As just one example, the connectors 44, 46 might be snap connected in a manner whereby they lock together as an incident of relative movement in directions in one manner but are prohibited from relatively moving oppositely to the movement in their connecting directions.

Figure 6:
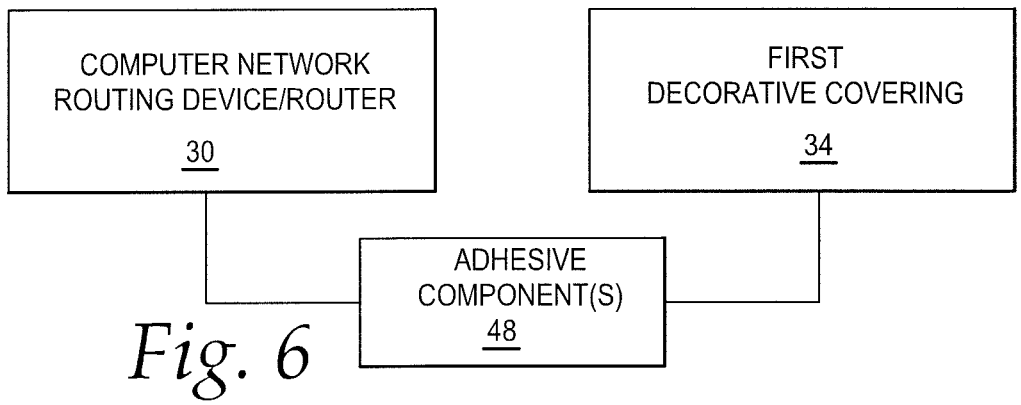

In an alternative form, as shown in FIG. 6, connection between the router 30 and first decorative covering 34 can be effected using at least one adhesive component 48. The adhesive component 48 may be a separate component or one provided on one or both of the router 30 and covering 34 and may have a composition such that as separate adhesive components 48 on the router 30 and first decorative covering 34 interact, they produce a bond that is either permanent or capable of being overcome without significantly damaging the router 30.

Figure 7:
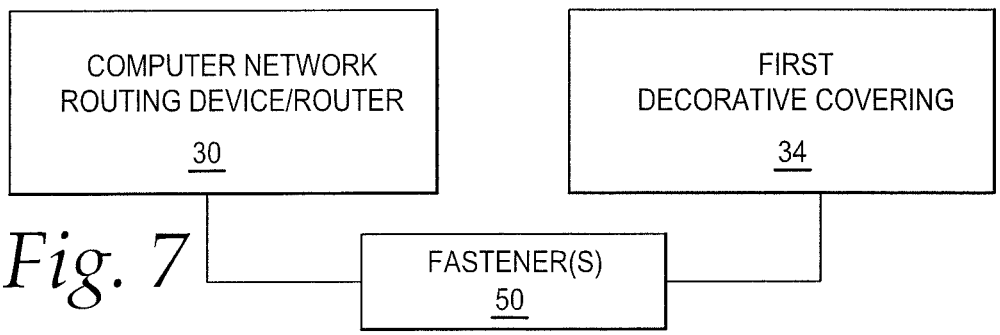

In a further variation, as shown in FIG. 7, one or more separate fasteners 50 may be used to effect connection between the router 30 and first decorative covering 34.

In all instances, the second decorative covering 36, and potentially additional decorative coverings with different appearances, can be configured to interact with the router 30 in the same manner as the first decorative covering 34. The generic showing in each of FIGS. 2-7 is intended to encompass virtually unlimited numbers of variations of components and their interactions. One skilled in the art would readily understand how to adapt each described version to effect connection between a router 30 and decorative covering 34, 36 to maintain the same in a connected relationship to form a unit such that the parts thereof can be moved together.

Figure 8:
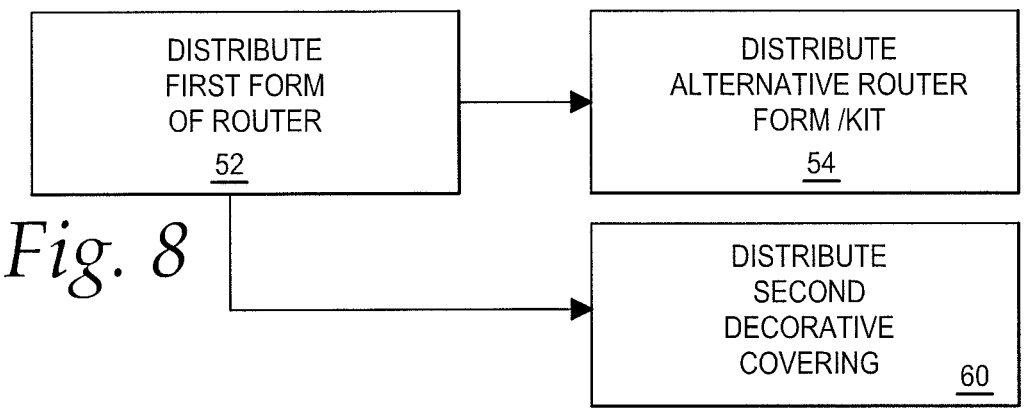
FIG. 8 is a flow diagram representation of a method of distributing stand-alone computer network routing devices, according to the invention.

The invention further contemplates a method of distributing stand-alone computer network routing devices, as shown in flow diagram form in FIG. 8. As shown at block 52, an entity distributes a first form of computer network routing device/router, as for example one in a conventional form. That is, the distributing entity may supply routers in the form made in the past without any anticipation that a decorative covering might be connected thereto.

As shown at block 54, the same entity may distribute a second form of router. The second form of router may be the same as, or similar to, the first form of router and is sold in conjunction with the first decorative covering.

Alternatively, in this step, the first form of the router may be sold that is at least one of: a) modified to be connected to the first decorative covering; or b) sold together with an adaptor assembly that allows connection to the first decorative covering.

Figure 9:
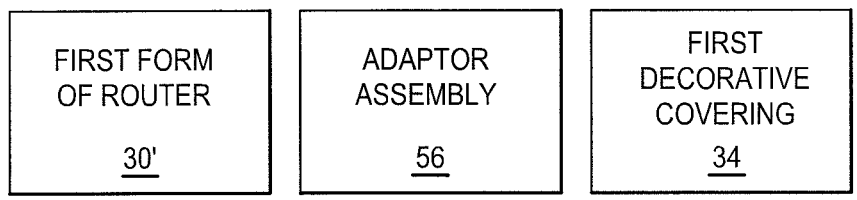
FIG. 9 is a schematic representation of an adaptor assembly usable to allow connection of the first decorative covering to a computer network routing device.

As shown schematically in FIG. 9, the first form of router is shown at 30' with an adaptor assembly 56 that together make up a kit 58. The adaptor assembly 56 is shown schematically as it may take virtually an unlimited number of different forms that may cooperate between the first form of router 30' and the first decorative covering 34 to effectively retrofit the first form of router 30' to allow it to be modified to accommodate the first decorative covering 34 in the same overall manner that the first decorative covering is accommodated by the router 30 in effecting connection thereto.

As shown in FIG. 8, at block 60, the same entity that performs the steps in blocks 52 and 54, or another entity, may additionally distribute a second decorative covering. That distributor may thus offer several options to the end user including providing another kit that includes different decorative coverings, giving the end user the opportunity to use one or the other, or interchange the same, as desired.

Figure 10:
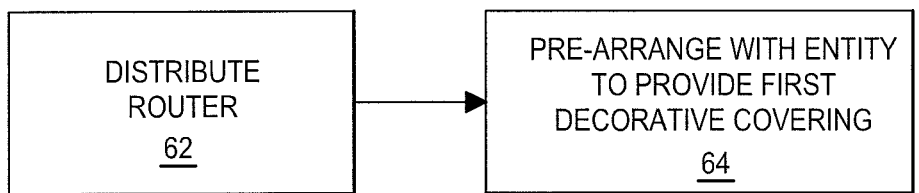
FIG. 10 is another flow diagram representation showing a method of distributing stand-alone computer network routing devices, according to the invention.

In a further aspect of the distribution process, as shown in FIG. 10, one entity may distribute a router as shown at block 62 with a pre-arrangement for another entity or entities to provide the first and/or second complementary decorative coverings, as shown respectively at blocks 64 and 66.

With this model, an entire network can be set up wherein a major router manufacturer may pre-arrange, as through licenses, with potentially myriad entities, to allow those entities to provide a particular decorative covering desired by that entity. As but one example, the routers may be provided to different schools and universities that will be authorized to effect a downstream distribution of the router and a particular, selectively, decorative covering promoting their institutional identities.

Figure 11:
FIG. 11 is a flow diagram representation of another form of distributing stand-alone computer network routing devices, according to the invention.

Downstream distributors may be authorized, as by a license, to provide their own appearance of decorative covering or may do so at the direction of the router distributor, FIG. 11 shows a method of distributing stand-alone computer network routing devices from the position of a downstream distributor. As shown at block 70, a router is received from the router manufacturer together with authorization, as through a license, to connect a decorative covering.

As shown at block 72, the downstream distributor provides a decorative covering to be connected to the router;

As shown at block 74, the downstream distributor re-sells the router and distributes the router with the decorative covering connected thereto. Alternatively, the downstream distributor may offer a kit which includes the router together with the decorative covering that may be connected to the router by the end user.

Overall, whereas the presence of routers in homes and businesses is often perceived as a liability, the ability to exploit the presence of the routers for potentially many different purposes, among which are advertising, promotion, decoration, etc., makes them potentially valuable assets for reasons other than their basic function. A potentially large market is opened up to different entities that might be part of the distribution network, described above.

The foregoing disclosure of specific embodiments is intended to be illustrative of the broad concepts comprehended by the invention.

The invention claimed is:

1. In combination:
    a stand-alone computer network routing device configured to receive and transmit electronic data,
    the computer network routing device having a housing with an exposed external surface; and
    a first decorative covering configured to be connected to the computer network routing device to overlie a substantial portion of the exposed external surface of the computer network routing device housing to thereby at least one of: a) cause the first decorative covering to substantially hide the identity of the computer network routing device; and b) cause the computer network routing device with the connected first decorative covering to have an aesthetic appearance that is at least one of: i) substantially altered from an appearance of the computer network routing device by itself; and ii) compatible with a room décor in which the computer network routing device is intended to be used,
    wherein the first decorative covering defines a first receptacle that is at least nominally matched to a shape of a portion of the external surface of the computer network routing device housing such that with the first decorative covering connected to computer network routing device, the portion of the external surface of the computer network routing device housing resides within the first receptacle.

2. The combination according to claim 1 further in combination with a second decorative covering configured to be connected to the computer network routing device in place of the first decorative covering, the second decorative covering having a function substantially the same as a function of the first decorative covering but causing the computer network routing device with the connected second decorative covering to have an appearance different than an appearance of the computer network routing device with the connected first decorative covering.

3. The combination according to claim 1 wherein the first decorative covering and computer network routing device are configured so that with the first decorative covering connected to the computer network routing device, the first decorative covering and computer network routing device are maintained together as a first unit with the first decorative covering and computer network routing device making up the first unit movable together as one piece.

4. The combination according to claim 1 wherein the first receptacle and the portion of the external surface of the computer network routing device housing are configured so that a majority of the external surface of the computer network routing device housing resides within the first receptacle with the first decorative covering connected to the computer network routing device.

5. The combination according to claim 1 wherein the computer network routing device and first decorative covering are configured so that the connected computer network routing device and first decorative covering are frictionally maintained together.

6. The combination according to claim 1 wherein there is at least one connector on each of the computer network routing device and the first decorative covering that interact to maintain the computer network routing device and first decorative covering connected.

7. The combination according to claim 6 wherein the at least one connector on the computer network routing device is an inseparable part of the computer network routing device and the at least one connector on the first decorative covering is an inseparable part of the first decorative covering.

8. The combination according to claim 6 wherein the at least one connector on the computer network routing device and at least one connector on the first decorative covering are configured to be snap-connected to each other.

9. The combination according to claim 1 further comprising at least one separate fastener that maintains the first decorative covering connected to the computer network routing device.

10. The combination according to claim 1 wherein the first decorative covering and the computer network routing device are configured so that the first decorative covering can be separably connected to the computer network routing device.

11. The combination according to claim 1 further comprising an adhesive component that maintains the first decorative covering connected to the computer network routing device.

12. A method of distributing stand-alone computer network routing devices, the method comprising the steps of:
   A) distributing a first form of computer network routing device; and
   B) distributing at least one of: a) a second form of computer network routing device with an exposed external surface together with a first decorative covering configured to be connected to the second form of computer network routing device to overlie a substantial portion of the exposed external surface of the second form of computer network routing device housing to thereby at least one of: i) cause the first decorative covering to hide the identity of the second form of computer network routing device; and ii) cause the second form of computer network routing device with the connected first decorative covering to have an aesthetic appearance that is at least one of: I) substantially altered from an appearance of the second form of computer network routing device by itself; and II) compatible with a room décor in which the second form of computer network routing device is intended to be used; or b) the first form of computer network routing device at least one of: i) modified to be connected to the first decorative covering; or ii) together with an adaptor assembly that is configured to be used to connect the first decorative covering to the first form of computer network routing device,
   wherein the first decorative covering defines a first receptacle that is at least nominally matched to a shape of a portion of the external surface of an associated computer network routing device housing such that with the first decorative covering connected to the associated computer network routing device, the portion of the external surface of the associated computer network routing device housing resides within in the first receptacle.

13. The method of distributing stand-alone computer network routing devices according to claim 12 further comprising the step of distributing a second decorative covering configured to be interchangeably connected with the first decorative covering and having a function substantially the same as the first decorative covering but causing one computer network routing device with the connected second decorative covering to have an appearance different than an appearance of the one computer network routing device with the connected first decorative covering.

14. The method of distributing stand-alone computer network routing devices according to claim 13 further comprising the steps of: pre-arranging with a first entity for the first entity to provide the first decorative covering and pre-arranging with a second entity for the second entity to provide the second decorative covering.

15. The method of distributing stand-alone computer network routing devices according to claim 14 wherein the first and second entities are different entities than an entity performing step A) and the first form of computer network routing device by itself is not configured to be connected to either the first or second decorative coverings.

16. The method of distributing stand-alone computer network routing devices according to claim 12 wherein the first decorative covering and an associated computer network routing device are configured so that with the first decorative covering connected to the associated computer network routing device, the first decorative covering and associated computer network routing device are maintained together as a first unit with the first decorative covering and associated computer network routing device making up the first unit movable together as one piece.

17. The method of distributing stand-alone computer network routing devices according to claim 12 wherein the first receptacle is configured so that a majority of the external surface of the associated computer network routing device housing resides within the first receptacle with the first decorative covering connected to the associated computer network routing device.

18. The method of distributing stand-alone computer network routing devices according to claim 12 wherein the first decorative covering and an associated computer network routing device are configured so that the associated computer network routing device and first decorative covering are frictionally maintained together.

19. The method of distributing stand-alone computer network routing devices according to claim 12 wherein there is at least one connector on each of the first decorative covering and an associated computer network routing device that interact to maintain the associated computer network routing device and first decorative covering connected.

20. The method of distributing stand-alone computer network routing devices according to claim 19 wherein the at least one connector on the associated computer network routing device is an inseparable part of the associated computer network routing device and the at least one connector on the first decorative covering is an inseparable part of the first decorative covering.

21. The method of distributing stand-alone computer network routing devices according to claim 19 wherein the at least one connector on the associated computer network routing device and at least one connector on the first decorative covering are configured to be snap-connected to each other.

22. The method of distributing stand-alone computer network routing devices according to claim 12 further comprising at least one fastener that maintains the first decorative covering connected to an associated computer network routing device.

23. The method of distributing stand-alone computer network routing devices according to claim 12 wherein the first decorative covering and an associated computer network routing device are configured so that the first decorative covering is separably connected to the associated computer network routing device.

24. The method of distributing stand-alone computer network routing devices according to claim 12 further comprising an adhesive component that maintains the first decorative covering connected to an associated computer network routing device.

* * * * *